United States Patent
Shimazaki et al.

(10) Patent No.: US 10,102,718 B2
(45) Date of Patent: Oct. 16, 2018

(54) PAYMENT PROCESSOR

(71) Applicant: TOSHIBA TEC KABUSHIKI KAISHA, Tokyo (JP)

(72) Inventors: Takeshi Shimazaki, Sunto Shizuoka (JP); Ran Nishihashi, Tokyo (JP); Hajime Kikugawa, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 361 days.

(21) Appl. No.: 14/629,205

(22) Filed: Feb. 23, 2015

(65) Prior Publication Data
US 2015/0254941 A1    Sep. 10, 2015

(30) Foreign Application Priority Data
Mar. 6, 2014   (JP) .................... 2014-044193

(51) Int. Cl.
| | | |
|---|---|---|
| G06Q 20/00 | (2012.01) | |
| G07G 1/00 | (2006.01) | |
| G07G 5/00 | (2006.01) | |
| G07G 1/12 | (2006.01) | |
| G06Q 20/20 | (2012.01) | |

(52) U.S. Cl.
CPC ........... *G07G 1/009* (2013.01); *G06Q 20/204* (2013.01); *G06Q 20/208* (2013.01); *G07G 1/12* (2013.01); *G07G 5/00* (2013.01)

(58) Field of Classification Search
CPC ........... H04Q 5/22; G06Q 20/20; G06Q 30/00
USPC ............. 340/10.52; 705/23, 17, 400; 186/49
See application file for complete search history.

(56) References Cited

U.S. PATENT DOCUMENTS

| | | | | |
|---|---|---|---|---|
| 7,527,196 B2* | 5/2009 | Murofushi | ............. | G06Q 20/20 235/375 |
| 7,527,197 B2* | 5/2009 | Murofushi | ............. | G06Q 20/20 235/375 |
| 8,010,409 B2* | 8/2011 | Iida | ......................... | G06Q 20/20 705/16 |
| 8,044,803 B2* | 10/2011 | Suzuki | .................. | G06Q 20/20 340/572.1 |

(Continued)

FOREIGN PATENT DOCUMENTS

| | | |
|---|---|---|
| JP | H04-17095 | 1/1992 |
| JP | H06-60271 | 3/1994 |

(Continued)

OTHER PUBLICATIONS

Japanese Office Action dated Mar. 28, 2017, filed in Japanese counterpart Patent Application No. 2014-044193, 13 pages (with English translation).

*Primary Examiner* — Oluseye Iwarere
(74) *Attorney, Agent, or Firm* — Patterson & Sheridan, LLP (57) ABSTRACT

In one embodiment, a payment processor has a processor which configured to controls checkout processing. The checkout processing includes payment processing of a product. An electronic tag is attached to the product, and stores tag data. The processor executes data-change processing to write readout-completed data in an electronic tag identified by the tag data stored in the memory after the payment processing of the product. The readout-completed data shows that the tag reader has read the electronic tag.

20 Claims, 6 Drawing Sheets

(56) References Cited

U.S. PATENT DOCUMENTS

| | | | | | |
|---|---|---|---|---|---|
| 2004/0249717 | A1* | 12/2004 | Shirasaki | | G06Q 20/204 705/17 |
| 2005/0049914 | A1* | 3/2005 | Parish | | G06Q 20/10 705/14.26 |
| 2006/0145857 | A1* | 7/2006 | Ono | | G06K 19/0723 340/572.3 |
| 2006/0261161 | A1* | 11/2006 | Murofushi | | G06Q 20/20 235/383 |
| 2007/0138271 | A1* | 6/2007 | Murofushi | | G06Q 20/20 235/383 |
| 2007/0288321 | A1* | 12/2007 | Endo | | G06Q 20/204 705/17 |
| 2008/0082423 | A1* | 4/2008 | Iida | | G06Q 20/20 705/17 |
| 2008/0084278 | A1* | 4/2008 | Iida | | G06Q 30/02 340/10.41 |
| 2008/0270324 | A1* | 10/2008 | Allard | | A47F 10/06 705/400 |
| 2008/0319869 | A1* | 12/2008 | Carlson | | G06Q 20/02 705/26.1 |
| 2009/0027205 | A1* | 1/2009 | Suzuki | | G06Q 20/20 340/572.1 |
| 2009/0201136 | A1* | 8/2009 | Itagaki | | G06Q 10/087 340/10.52 |
| 2010/0223147 | A1* | 9/2010 | Oishi | | G06Q 20/208 705/23 |
| 2010/0250381 | A1* | 9/2010 | Snyder | | A47F 9/04 705/21 |
| 2011/0080268 | A1* | 4/2011 | Kaneko | | G06K 19/07345 340/10.4 |
| 2012/0055995 | A1* | 3/2012 | Miyazaki | | G08B 13/246 235/454 |
| 2012/0185355 | A1* | 7/2012 | Kilroy | | G06Q 30/0633 705/26.8 |
| 2012/0197744 | A1* | 8/2012 | Rose | | G06Q 20/202 705/17 |
| 2013/0041776 | A1* | 2/2013 | Schunemann | | G06Q 30/02 705/26.41 |
| 2013/0290234 | A1* | 10/2013 | Harris | | G06N 5/022 706/46 |
| 2016/0012465 | A1* | 1/2016 | Sharp | | G06Q 20/18 705/14.17 |

FOREIGN PATENT DOCUMENTS

| | | |
|---|---|---|
| JP | H06-301859 | 10/1994 |
| JP | H06-86183 U | 12/1994 |
| JP | 2000-030157 | 1/2000 |
| JP | 2006-227997 | 8/2006 |
| JP | 2009-020394 | 1/2009 |
| JP | 2010-170582 | 8/2010 |
| JP | 2012-222595 | 11/2012 |

* cited by examiner

PAYMENT PROCESSOR

CROSS-REFERENCE TO RELATED APPLICATION

This application is based upon and claims the benefit of priority from the prior Japanese Patent Application No. 2014-044193, filed on Mar. 6, 2014, the entire contents of which are incorporated herein by reference.

FIELD

The below-described embodiments generally relate to payment processors.

BACKGROUND

In recent years, in the retail industry, the checkout system using RFID (radio frequency identification) tags is often employed. This kind of system employs a tag reader. The tag reader reads data stored in RFID tags attached to products wirelessly, for example. Hereinafter, the data stored in RFID tags will be referred to as tag data. The tag reader reads the tag data, and the system therefore collects information on products that a buyer wants to buy.

If there is a plurality of RFID tags in the communication range of the tag reader, the plurality of RFID tags may send tag data simultaneously, the tag data may thereby interfere with each other, and the tag reader may not thereby read the tag data. The tag reader employs an anti-collision technology in order to prevent the situation, in which it is not possible to read tag data, from occurring. The tag reader, which employs the anti-collision technology, has an improved ability to reliably read tag data from all the RFID tags.

Some RFID tags are capable of storing data, which shows that a tag reader has read their tag data. Specifically, for example, a RFID tag stores a 1-bit flag, receives a predetermined command from a tag reader, and sets the flag. The RFID tag stores data, which shows that a tag reader has read its tag data, by setting the flag. The system is capable of confirming if the tag reader has read tag data or not by confirming the status of the flag of the RFID tag.

Further, in the past system, the tag reader sends a predetermined command if the tag reader reads tag data accurately. The predetermined command contains identification information of an RFID tag, which is contained in the tag data. Hereinafter, the identification information on an RFID tag will be referred to as tag code. The RFID tag receives the command. The RFID tag sets a flag if a tag code contained in the command is the same as its tag code.

Meanwhile, according to an idea of recent years, RFID tags are also used as security tags. For example, when a buyer brings products and passes through a security gate including the tag reader, the tag reader of the security gate reads tag data from RFID tags attached to the products. The security gate raises an alarm if a flag of the read tag data is not in the set-status.

As described above, when the tag reader reads tag data, RFID tags set the flags. If the tag reader reads tag data and then a buyer brings products, of which the payment processing is yet to be executed, and passes through the security gate, the security gate is not capable of detecting an abnormality.

In view of the above-mentioned circumstances, it is desirable to improve a function of preventing a buyer from bringing products out of a store unfairly in the past system, in which electronic tags such as RFID tags are used as security tags.

DETAILED DESCRIPTION

According to one embodiment, a payment processor includes an operation panel, a tag reader, a memory, and a processor. The operation panel detects a request to start checkout processing. The checkout processing includes payment processing of a product. The operation panel further detects a request to start the payment processing. The tag reader reads tag data stored in an electronic tag attached to the product. The memory stores the tag data read by the tag reader. The processor activates the tag reader and causes the tag reader to start readout-operation when the operation panel detects the request to start the checkout processing of the product. The processor writes tag data read by the activated tag reader in the memory. The processor further stops the readout-operation by the tag reader when the operation panel detects the request to start the payment processing of the product. The processor executes the payment processing of the product after the readout-operation by the tag reader is stopped. The processor executes data-change processing to write readout-completed data in an electronic tag identified by the tag data stored in the memory after the payment processing of the product. The readout-completed data shows that the tag reader has read the electronic tag.

Hereinafter, another embodiment will be described with reference to the drawings. In the drawings, the same or similar components are denoted by the same reference numerals. In a first embodiment, a payment processor is, for example, a self-checkout machine. The self-checkout machine of the first embodiment is also referred to as a self-checkout product-sale data processor (POS terminal) or a self-service cash-register machine.

Figure 1:
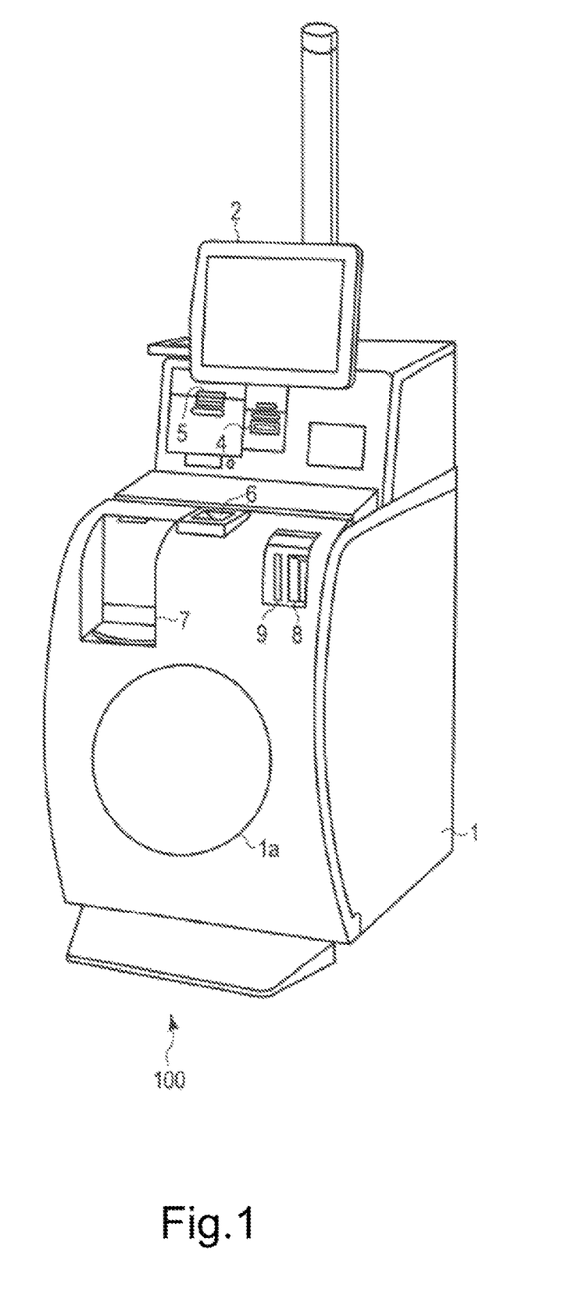
FIG. 1 is a perspective view showing an outer appearance of a self-checkout machine of a first embodiment.

FIG. 1 is a perspective view showing an outer appearance of a self-checkout machine of the first embodiment.

As shown in FIG. 1, a self-checkout machine 100 includes a housing 1, an operation panel 2, a card slot 4, a receipt slot 5, a coin slot 6, a coin-tray-for-change 7, a bill-slot-for-payment 8, and a bill-slot-for-change 9.

The housing 1 is made of metal materials and resin materials in combination, and has a box shape. The housing 1 has an opening 1a. The opening 1a is formed on the operator-side surface (front surface in FIG. 1), which faces an operator (for example, buyer). The tag-reading space inside the housing 1 is in communication with the space outside the housing 1 via the opening 1a.

The operation panel 2 is fixed to the top of the housing 1. The operation panel 2 includes a touchscreen panel. Hereinafter, the operation panel will be referred to as the touchscreen panel 2. The touchscreen panel 2 displays arbitrary images. An operator touches the touchscreen panel 2. The touchscreen panel 2 detects the operation, and inputs information on the operation in the self-checkout machine 100.

Each of the card slot 4, the receipt slot 5, the coin slot 6, the coin-tray-for-change 7, the bill-slot-for-payment 8, and the bill-slot-for-change 9 is made of only a metal material, only a resin material, or a metal material and a resin material in combination. The card slot 4, the receipt slot 5, the coin slot 6, the coin-tray-for-change 7, the bill-slot-for-payment 8, and the bill-slot-for-change 9 are mounted on the housing 1. A buyer inserts a card such as a credit card in the card slot 4 of the housing 1, and the card is discharged from the card slot 4 to the outside of the housing 1. A receipt is discharged from the receipt slot 5 to the outside of the housing 1. A buyer inserts coins in the coin slot 6 of the housing 1. Coins are discharged from the coin-tray-for-change 7 to the outside of the housing 1. A buyer inserts bills in the bill-slot-for-payment 8 of the housing 1. Bills are discharged from the bill-slot-for-change 9 to the outside of the housing 1.

Figure 2:
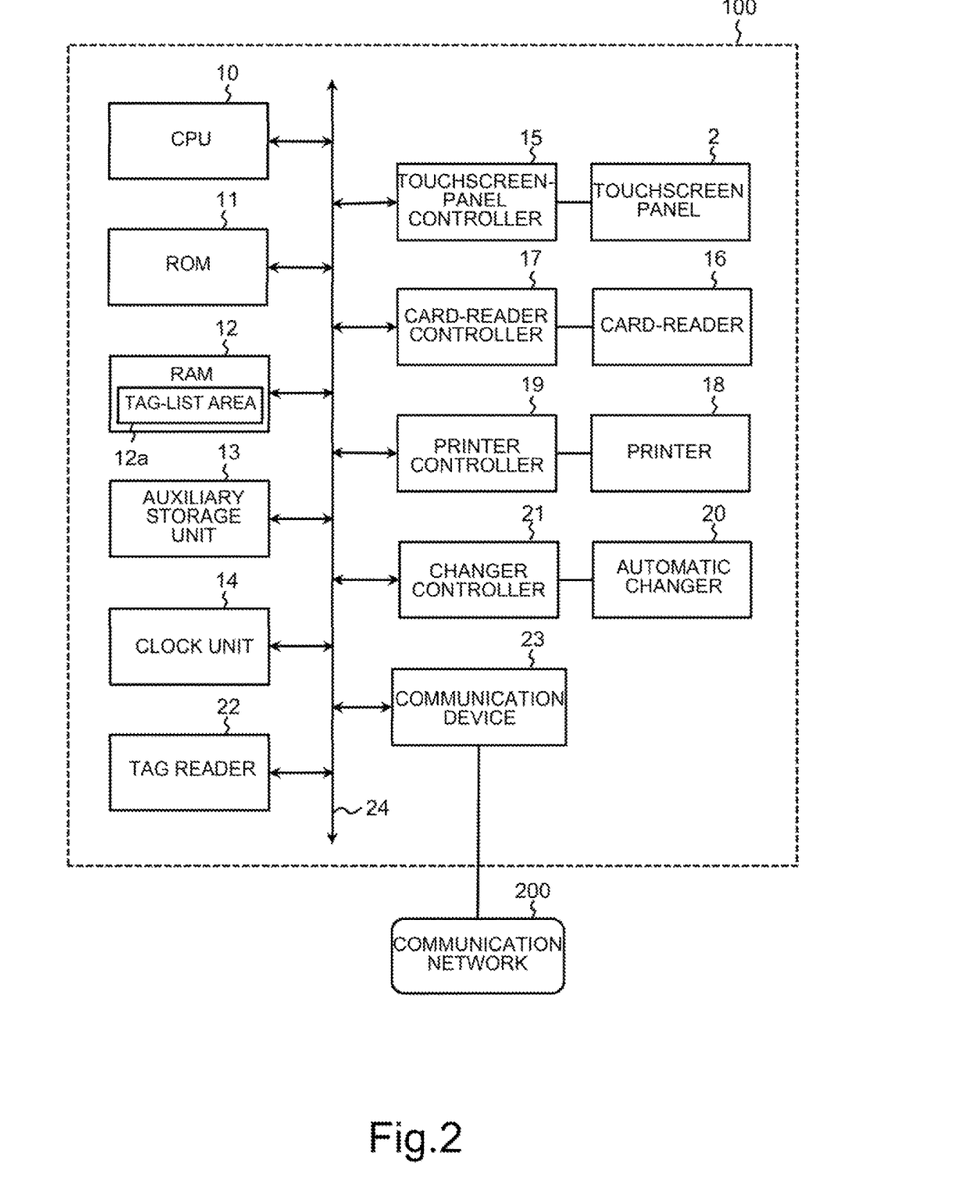
FIG. 2 is a block diagram showing the hardware configuration of the self-checkout machine of the first embodiment.

FIG. 2 is a block diagram showing the hardware configuration of the self-checkout machine of the first embodiment. Note that, in FIG. 2, the same components as the components of FIG. 1 are denoted by the same reference numerals as the reference numerals of FIG. 1. Detailed description of the same components as the components of FIG. 1 will be omitted.

The self-checkout machine 100 of FIG. 2 includes a processor and memories. The processor includes for example a CPU (central processing unit) 10. The memories include a ROM (read-only memory) 11, a RAM (random-access memory) 12, and an auxiliary storage unit 13. The self-checkout machine 100 further includes a clock unit 14, a touchscreen-panel controller 15, a card-reader 16, a card-reader controller 17, a printer 18, a printer controller 19, an automatic changer 20, a changer controller 21, a tag reader 22, and a communication device 23. The CPU 10, the ROM 11, the RAM 12, the auxiliary storage unit 13, the clock unit 14, the touchscreen-panel controller 15, the card-reader controller 17, the printer controller 19, the changer controller 21, the tag reader 22, and the communication device 23 are connected to a bus line 24. The CPU 10, the ROM 11, the RAM 12, the auxiliary storage unit 13, the clock unit 14, the touchscreen-panel controller 15, the card-reader 16, the card-reader controller 17, the printer 18, the printer controller 19, the automatic changer 20, the changer controller 21, and the communication device 23 are inside the housing 1.

The CPU 10, the ROM 11, the RAM 12, and the auxiliary storage unit 13 are connected to the bus line 24, and thereby configure a computer.

The CPU 10 is the nucleus of the computer. The CPU 10 controls the respective pieces of hardware in order to realize various types of behavior of the self-checkout machine 100 based on the operating system, the middleware, and the application programs stored in the ROM 11 and the auxiliary storage unit 13.

The ROM 11 is a main storage of the computer. The ROM 11 stores the operating system. The ROM 11 stores the middleware and the application programs. The ROM 11 may further store data, which the CPU 10 retrieves when the CPU 10 processes various types of information.

The RAM 12 is a main storage of the computer. The RAM 12 stores data, which the CPU 10 retrieves when the CPU 10 processes various types of information. Further, the RAM 12 functions as a so-called working area. The working area temporarily stores data, which the CPU 10 uses when the CPU 10 processes various types of information. The RAM 12 has, as part of the storage area, a product-list area and a tag-list area 12a. The product-list area stores a product list. The product list contains pieces of product information that the CPU 10 obtains (see Act10 and Act11 of FIG. 3 (described below)). The tag-list area 12a stores pieces of tag data (described below), or stores tag codes (described below) contained in pieces of tag data.

The auxiliary storage unit 13 is an auxiliary storage of the computer. The auxiliary storage unit 13 includes, for example, a hard disk drive, an SSD (solid state drive), and the like. The auxiliary storage unit 13 stores data, which the CPU 10 uses when the CPU 10 processes various types of information, and data generated when the CPU 10 processes information. Further, not the ROM 11 but the auxiliary storage unit 13 may store the middleware and the application programs.

The clock unit 14 keeps time constantly, and thereby generates date/time information, which shows date and time.

Controlled by the CPU 10, the touchscreen-panel controller 15 controls the touchscreen panel 2 to display images. Further, when a user touches the touchscreen panel 2, in response, the touchscreen-panel controller 15 supplies information, which is output from the touchscreen panel 2, to the CPU 10 via the RAM 12, for example.

A card is inserted in the card slot 4, and the card-reader 16 reads card-information stored in the card. Examples of the card include a payment card and a loyalty card. Examples of the payment card include a credit card, a debit card, and a prepaid card. The card-reader 16 may also write information in the card.

Controlled by the CPU 10, the card-reader controller 17 controls how the card-reader 16 behaves. Further, the card-reader 16 outputs card-information to the card-reader controller 17. The card-reader controller 17 supplies the card-information to the RAM 12. The CPU 10 retrieves the card-information from the RAM 12.

The printer 18 is a thermal printer or a dot impact printer, for example. The printer 18 prints out a receipt (described below). The printer 18 discharges the printed receipt from the receipt slot 5.

Controlled by the CPU 10, the printer controller 19 controls how the printer 18 behaves.

The automatic changer 20 receives coins and bills inserted in the coin slot 6 and the bill-slot-for-payment 8. Further, depending on the received coins and bills, the automatic changer 20 discharges coins and bills as change from the coin-tray-for-change 7 and the bill-slot-for-change 9.

Controlled by the CPU 10, the changer controller 21 controls how the automatic changer 20 behaves.

The tag reader 22 includes known components such as an antenna, a sending circuit, and a receiving circuit, for example. The tag reader 22 has a predetermined readable zone. The tag reader 22 is capable of reading tag data from the predetermined readable zone. Hereinafter, the predetermined readable zone will be referred to as tag-readable zone. The tag reader 22 reads pieces of tag data from electronic tags in the tag-readable zone. The electronic tag is an RFID tag, for example. Hereinafter, the electronic tag will be referred to as RFID tag. The RFID tag is attached to a product. The RFID tag stores tag data. The tag data includes a product code. The product code is identification data, and identifies the product to which the RFID tag is attached. The tag data includes identification information, which identifies the RFID tag. Hereinafter, the identification information on an RFID tag will be referred to as tag code. The tag data further includes a 1-bit flag (described below).

The communication device 23 communicates with another machine such as a server (not shown) via a communication network 200 such as a LAN (local area network) or the Internet.

Meanwhile, the ROM 11 (or the auxiliary storage unit 13) stores an application program, i.e., a control program, which causes the CPU 10 to execute control processing (described below) (control processing of FIG. 3 and FIG. 4). The control program includes instructions, based on which the computer is capable of operating. The CPU 10 operates based on the instructions, and thereby executes the control processing of FIG. 3 and FIG. 4. Typically, the control program is stored in the ROM 11 (or the auxiliary storage unit 13) when the self-checkout machine 100 is supplied (sold and transferred). In other words, the self-checkout machine 100 prestores the control program in the ROM 11 (or the auxiliary storage unit 13). Alternatively, the supplied self-checkout machine 100 may not yet store the control program in the ROM 11 or the auxiliary storage unit 13. For example, the control program may be stored in a removable storage medium such as a magnetic disk, a magnet-optical disk, an optical disk, or a semiconductor memory. Both the removable storage medium and the self-checkout machine 100 as hardware may be supplied. Alternatively, the control program may be supplied via a network. The control program may be written in the auxiliary storage unit 13 of the supplied self-checkout machine 100.

Hereinafter, with reference to FIG. 3 and FIG. 4, control processing for checkout processing, which the self-checkout machine 100 executes, will be described. The checkout processing includes payment processing.

Figure 3:
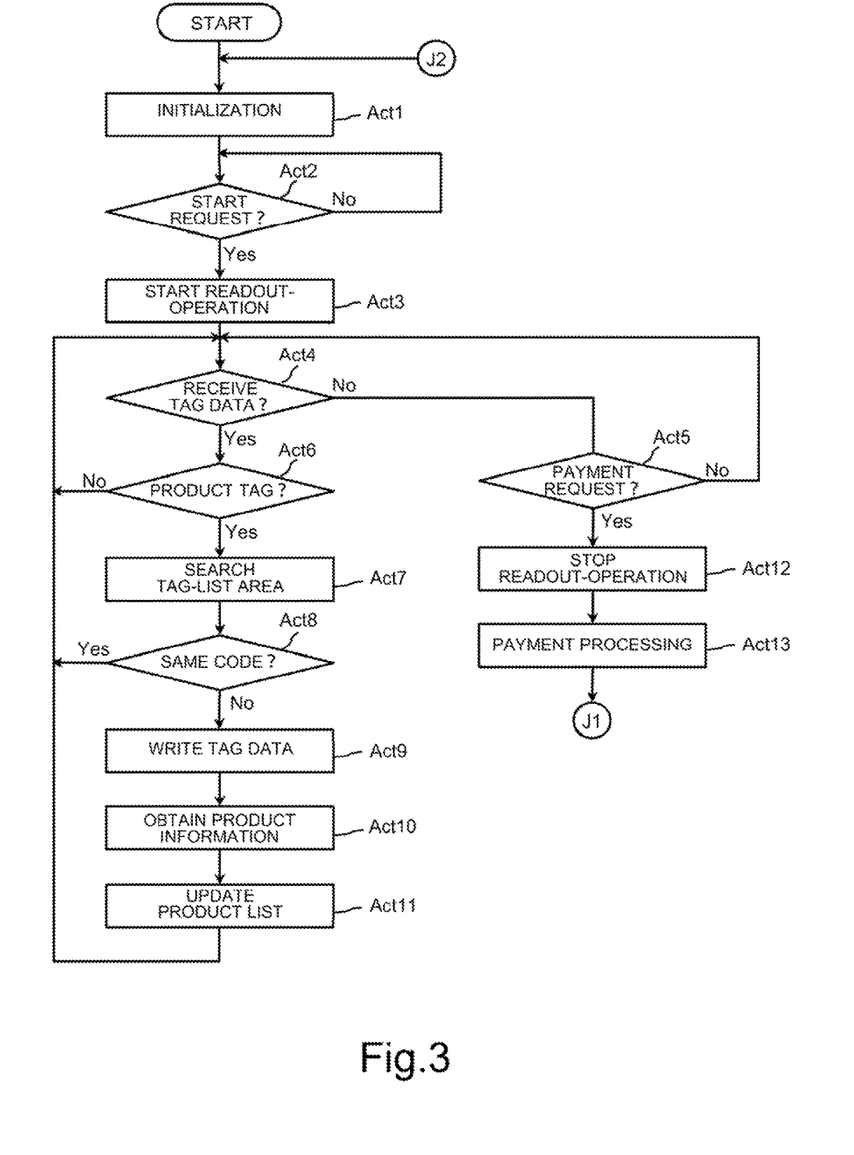
FIG. 3 is a flowchart showing control processing that the self-checkout machine of the first embodiment executes.
Figure 4:
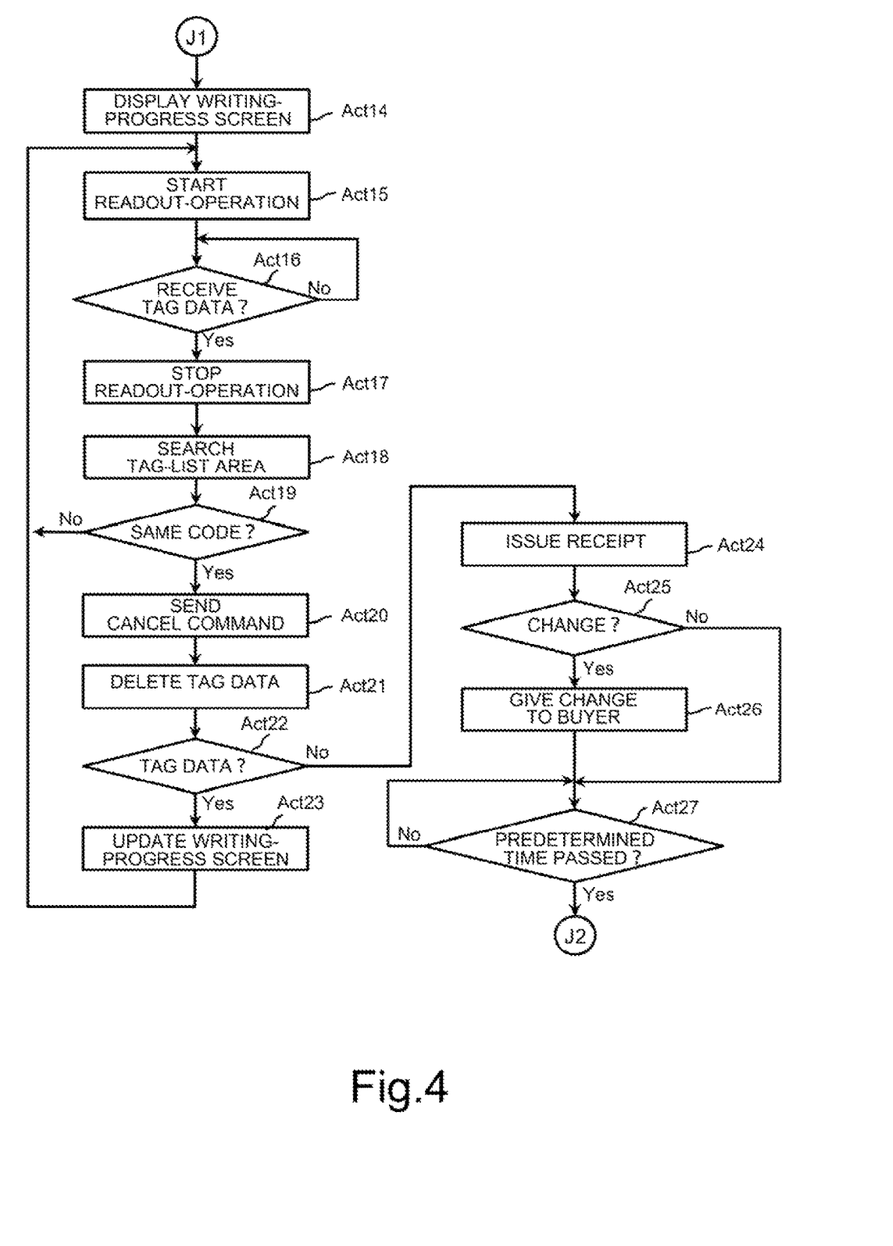
FIG. 4 is a flowchart showing the control processing that the self-checkout machine of the first embodiment executes.

FIG. 3 and FIG. 4 are flowcharts showing control processing that the CPU 10 executes.

The CPU 10 executes the control processing of FIG. 3 and FIG. 4 based on the control program stored in the ROM 11 (or the auxiliary storage unit 13). Specifically, as described above, the CPU 10 executes the computer-executable instructions in the control program, and thereby executes the control processing of FIG. 3 and FIG. 4. Note that the below-described processing is merely an example, and various types of processing may be alternatively executed to obtain the similar result.

For example, a store manager turns on the power switch (not shown) of the self-checkout machine 100. The CPU 10 is booted when the self-checkout machine 100 is turned on. The CPU 10 starts the control processing of FIG. 3 and FIG. 4.

As shown in FIG. 3, in Act1, the CPU 10 executes initialization processing. In the initialization processing, the CPU 10 clears information stored in the tag-list area 12a of the RAM 12 and information stored in the product-list area of the RAM 12. Further, in the initialization processing, the CPU 10 causes the touchscreen panel 2 to display a startup screen. Note that a buyer's-guide screen is displayed on the startup screen for a buyer, who wants to use the self-checkout machine 100 and to go through checkout procedure. After the initialization processing, the CPU 10 proceeds to Act2 of the control processing.

In Act2, the CPU 10 determines if a request to start the checkout procedure is input or not. If the CPU 10 determines that a request to start the checkout procedure is not input (Act2, No), the CPU 10 returns to Act2 of the control processing. For example, if the touchscreen panel 2 does not detect that a buyer touches a start button on the startup screen, the CPU 10 determines that a request to start the checkout procedure is not input based on that fact. The CPU 10 repeats the processing of Act2. This situation means that the CPU 10 is in the standby mode. In the standby mode, the CPU 10 waits for a request to start the checkout procedure input by a buyer. Meanwhile, if the CPU 10 determines that a request to start the checkout procedure is input (Act2, Yes), the CPU 10 proceeds to Act3 of the control processing. For example, if the touchscreen panel 2 detects that a buyer touches the start button, the CPU 10 determines that a request to start the checkout procedure is input based on that fact. Note that a buyer, who wants to go through checkout procedure, puts products-to-buy in the opening 1a of the tag-reading space when he requests to start the checkout procedure.

In Act3, the CPU 10 causes the tag reader 22 to execute readout-operation. When the CPU 10 activates the tag reader 22, the tag reader 22 reads tag data one piece by one piece from the RFID tags of the products in the tag-readable zone based on a known procedure. Every time the tag reader 22 reads one piece of tag data of a product, the tag reader 22 notifies the CPU 10 of that piece of tag data. When the tag reader 22 notifies the CPU 10 of pieces of tag data, the CPU 10 causes the touchscreen panel 2 to display a registration screen. The registration screen shows a list of the products that the CPU 10 identifies. Specifically, the CPU 10 identifies the products-to-buy based on the read tag data. The CPU 10 superimposes texts on a preset basic image. The texts show the product names, prices, and the like of the identified products. The CPU 10 thereby generates the registration screen. A payment button is displayed on the registration screen. The payment button is used to input a request to start payment processing. After the CPU 10 causes the tag reader 22 to execute the readout-operation, the CPU 10 proceeds to Act4 of the control processing.

In Act4, the CPU 10 determines if the tag reader 22 receives tag data or not. If the CPU 10 determines that the tag reader 22 does not receive tag data (Act4, No), the CPU 10 proceeds to Act5 of the control processing. For example, if the CPU 10 does not receive a notification that the tag reader 22 receives tag data, the CPU 10 determines that the tag reader 22 does not receive tag data based on that fact.

In Act5, the CPU 10 determines if a request to start payment processing is input or not. If the CPU 10 determines that a request to start the payment processing is not input (Act5, No), the CPU 10 returns to Act4 of the control processing. For example, if the touchscreen panel 2 does not detect that a buyer touches the payment button on the registration screen, the CPU 10 determines that a request to start the payment processing is not input based on that fact.

The CPU 10 repeats the processing of Act4 and Act5. This situation means that the CPU 10 is in the standby mode. In the standby mode, the CPU 10 waits for tag data to be received or waits for a request to start the payment processing. In Act4, if the CPU 10 determines that the tag reader 22 receives tag data (Act4, Yes), the CPU 10 proceeds to Act6 of the control processing. For example, if the CPU 10 receives a notification that the tag reader 22 receives tag data, the CPU 10 determines that the tag reader 22 receives tag data based on that fact.

In Act6, the CPU 10 determines if the tag data received by the tag reader 22 (hereinafter referred to as received tag data) is tag data of an RFID tag, which is attached to a product sold at the store in which the self-checkout machine 100 is installed, (hereinafter referred to as product tag) or not. If the CPU 10 determines that the received tag data is tag data of a product tag (Act6, Yes), the CPU 10 proceeds to Act7 of the control processing.

In Act7, the CPU 10 searches the tag-list area 12a for the tag code in the received tag data, as a key. After the CPU 10 searches the tag-list area 12a, the CPU 10 proceeds to Act8 of the control processing.

In Act8, the CPU 10 determines if the tag-list area 12a stores the same tag code as the tag code in the received tag data or not (result of the search). If the CPU 10 determines that the tag-list area 12a does not store the same tag code (Act8, No), the CPU 10 proceeds to Act9 of the control processing.

In Act9, the CPU 10 adds the received tag data to the tag-list area 12a. In the adding processing, it is not necessary for the CPU 10 to write all the information on the received tag data. The CPU 10 writes at least the tag codes in the tag-list area 12a. The CPU 10 sometimes repeats the processing of Act9 (described below). In this case, the CPU 10 writes the new tag data in the tag-list area 12a without deleting the tag data already stored in the tag-list area 12a. In other words, the tag-list area 12a functions as storing means for storing a plurality of pieces of tag data. Further, when the CPU 10 executes the control processing based on the control program, the computer, which includes the CPU 10 as the nucleus, functions as writing means. After the CPU 10 writes the tag data, the CPU 10 proceeds to Act10 of the control processing.

In Act10, the CPU 10 obtains product information based on the product codes in the received tag data. For example, the auxiliary storage unit 13 may prestore product information, and the CPU 10 may retrieve product information based on the product codes. Alternatively, for example, the CPU 10 may notify a server of the store or the like of the product codes, the server may deliver product information based on the product codes, and the CPU 10 may receive the product information via the communication network 200. After the CPU 10 obtains the product information, the CPU 10 proceeds to Act11 of the control processing.

In Act11, the CPU 10 updates the product list stored in the RAM 12. The updated product list contains the product information obtained as described above. After the CPU 10 updates the product list, the CPU 10 returns to Act4 of the control processing. In Act4 and Act5, the CPU 10 is in the standby mode again. In the standby mode, the CPU 10 waits for new tag data to be received or waits for a request to start the payment processing. The CPU 10 updates the registration screen displayed on the touchscreen panel 2. The updated registration screen shows information on the updated product list.

Meanwhile, in Act6, if the CPU 10 determines that the received tag data is not tag data of a product tag (Act6, No), the CPU 10 returns to Act4 of the control processing. Further, in Act8, if the CPU 10 determines that the tag-list area 12a stores the same tag code (Act8, Yes), the CPU 10 skips the processing of Act9 to Act11. The CPU 10 returns from Act8 to Act4 of the control processing. In Act4, the CPU 10 is in the standby mode again. In other words, if the received tag data is not tag data of a product tag, the CPU 10 does not write the received tag data in the tag-list area 12a. Further, if the tag-list area 12a stores the same tag code as the tag code in the received tag data, the CPU 10 does not update the product list based on the received tag data. The CPU 10 discards the received tag data.

The buyer confirms the registration screen on the touchscreen panel 2, for example, and thereby confirms that all the put-in products are identified. Then the buyer touches the payment button on the registration screen. The touchscreen panel 2 detects that the buyer touches the payment button. Then the touchscreen panel 2 notifies the CPU 10 that the touchscreen panel 2 detects that the payment button is touched. In Act5, if the CPU 10 receives the notification, the CPU 10 determines that a request to start the payment processing is input. If the CPU 10 determines that a request to start the payment processing is input (Act5, Yes), the CPU 10 proceeds to Act12 of the control processing.

In Act12, the CPU 10 causes the tag reader 22 to stop the readout-operation. In other words, the CPU 10 executes the control processing based on the control program. The computer, which includes the CPU 10 as the nucleus, thereby functions as stop-control means. After the CPU 10 causes the tag reader 22 to stop the readout-operation, the CPU 10 proceeds to Act13 of the control processing.

In Act13, the CPU 10 executes the payment processing of the products listed in the product list (see Act11) stored in the RAM 12. The payment processing is similar to processing executed by a known self-checkout machine in the past. The CPU 10 determines the time, at which the request to start the checkout procedure is input, (see Act2) as the start time. The CPU 10 executes the payment processing based on the tag data, which is read by the tag reader 22 after the request to start the checkout procedure is input. In other words, when the CPU 10 executes the control processing based on the control program, the computer, which includes the CPU 10 as the nucleus, functions as payment means. After the payment processing is completed, the CPU 10 proceeds to Act14 of the control processing of FIG. 4.

In Act14, the CPU 10 causes the touchscreen panel 2 to display a writing-progress screen. The writing-progress screen calls the buyer's attention, and the buyer therefore will not take the products off the tag-reading space. Controlled by the CPU 10, the touchscreen panel 2 displays the writing-progress screen. The user-friendly writing-progress screen notifies the buyer that the writing processing is on the way. The touchscreen panel 2 may display a plurality of images one by one on the writing-progress screen in a short period. The buyer thereby visually recognizes a moving image such as a moving circular symbol. In other words, when the CPU 10 executes the control processing based on the control program, the computer, which includes the CPU 10 as the nucleus, functions as display-control means. Further, the display-control means cooperates with the touchscreen panel 2, and they thereby functions as display means.

Figure 5:
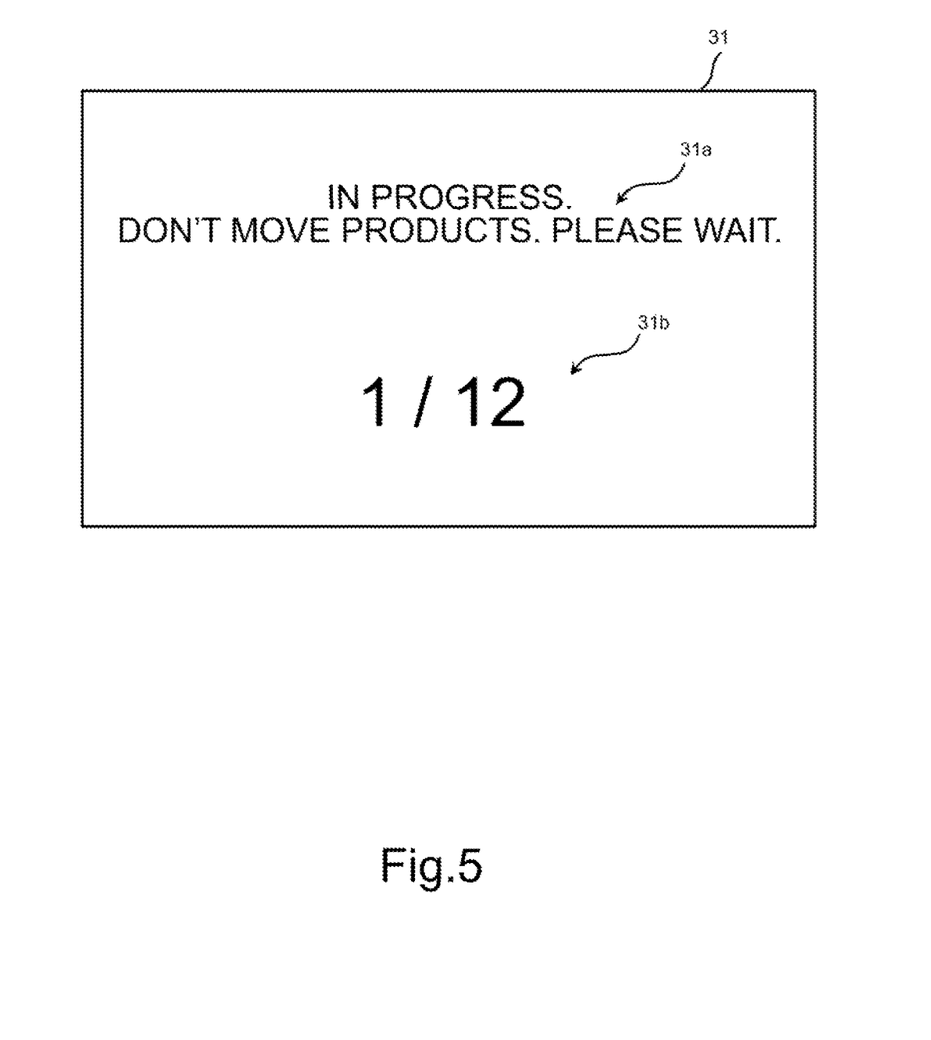
FIG. 5 is a diagram showing an example of a writing-progress screen that the self-checkout machine of the first embodiment displays.

Hereinafter, the writing-progress screen will be described with reference to FIG. 5. FIG. 5 is a diagram showing an example of a writing-progress screen 31.

As shown in FIG. 5, texts 31a, 31b are displayed on the writing-progress screen 31. The text 31a calls a buyer's attention. For example the text 31a says "In process. Don't move products. Please wait", etc. The text 31b informs the buyer of the writing progress. For example, the text 31b says "1/12", etc. It means that the writing processing of the first product out of the twelve products is on the way.

After displaying the writing-progress screen 31 in Act14, the CPU 10 proceeds to Act15 of the control processing. In Act15, the CPU 10 causes the tag reader 22 to start readout-operation. After the CPU 10 causes the tag reader 22 to start readout-operation, the CPU 10 proceeds to Act16 of the control processing.

In Act16, the CPU 10 determines if the tag reader 22 receives tag data or not. If the CPU 10 determines that the tag reader 22 does not receive tag data (Act16, No), the CPU 10 returns to Act16 of the control processing. As described above, if the CPU 10 does not receive a notification that the tag reader 22 receives tag data, the CPU 10 determines that the tag reader 22 does not receive tag data based on that fact. The CPU 10 repeats the processing of Act16. This situation means that the CPU 10 is in the standby mode. In the standby mode, the CPU 10 waits for tag data to be received. Meanwhile, if the CPU 10 determines that the tag reader 22 receives tag data (Act16, Yes), the CPU 10 proceeds to Act17 of the control processing. As described above, if the CPU 10 receives a notification that the tag reader 22 receives tag data, the CPU 10 determines that the tag reader 22 receives tag data based on that fact.

In Act17, the CPU 10 causes the tag reader 22 to stop the readout-operation. After the CPU 10 causes the tag reader 22 to stop the readout-operation, the CPU 10 proceeds to Act18 of the control processing.

In Act18 to Act20 (described below), the CPU 10 compares the received tag data to tag data (see Act9) written in the memory, and identifies an RFID tag based on the result. The CPU 10 executes data-change processing. In the data-change processing, the CPU 10 writes readout-completed data in the identified RFID tag. The readout-completed data shows that the tag reader 22 has read the electronic tag. Specifically, in Act18, the CPU 10 searches the tag-list area 12a for the tag code in the received tag data, as a key. After the CPU 10 searches the tag-list area 12a, the CPU 10 proceeds to Act19 of the control processing.

In Act19, the CPU 10 determines if the tag-list area 12a stores the same tag code as the tag code in the received tag data or not (result of the search). If the CPU 10 determines that the tag-list area 12a stores the same tag code (Act19, Yes), the CPU 10 proceeds to Act20 of the control processing.

In Act20, the CPU 10 causes the tag reader 22 to send a cancel command to an RFID tag, which stores the received tag data containing the same tag code as a tag code stored in the tag-list area 12a. The CPU 10 adds the tag code, which is contained in the received tag data, to the cancel command. Each RFID tag stores a flag. The flag shows that readout by the tag reader 22 is completed or not. If the RFID tag receives the cancel command, the RFID tag compares the tag code, which is contained in the cancel command, to its own tag code. If its own tag code is the same as the tag code in the cancel command (result of the comparison), the RFID tag sets a flag. The flag serves as the readout-completed data. If its own tag code is different from the tag code in the received cancel command, the RFID tag ignores the cancel command. To set the flag means to change the data that the RFID tag stores. As a result, it is possible to determine that the tag reader 22 has read its tag data. In other words, when the CPU 10 executes the control processing based on the control program, the computer, which includes the CPU 10 as the nucleus, functions as change-control means. To set the flag is equivalent to write readout-completed data "1" in the RFID tag. It is possible to determine that the tag reader 22 has read its tag data based on the readout-completed data "1". After the CPU 10 causes the tag reader 22 to send the cancel command, the CPU 10 proceeds to Act21 of the control processing.

In Act21, the CPU 10 executes deletion processing. In the deletion processing, the CPU 10 deletes the tag code, which is contained in the received tag data, from the tag-list area 12a. In other words, when the CPU 10 executes the control processing based on the control program, the computer, which includes the CPU 10 as the nucleus, functions as deletion means. After the CPU 10 deletes the tag code, the CPU 10 proceeds to Act22 of the control processing.

In Act22, the CPU 10 determines if the tag-list area 12a still stores a tag code or not. If the CPU 10 determines that the tag-list area 12a still stores a tag code (Act22, Yes), the CPU 10 proceeds to Act23 of the control processing.

In Act23, the CPU 10 updates the writing-progress screen 31. Specifically, the CPU 10 updates the writing-progress screen 31, and the updated writing-progress screen 31 shows change of the progress.

Figure 6:
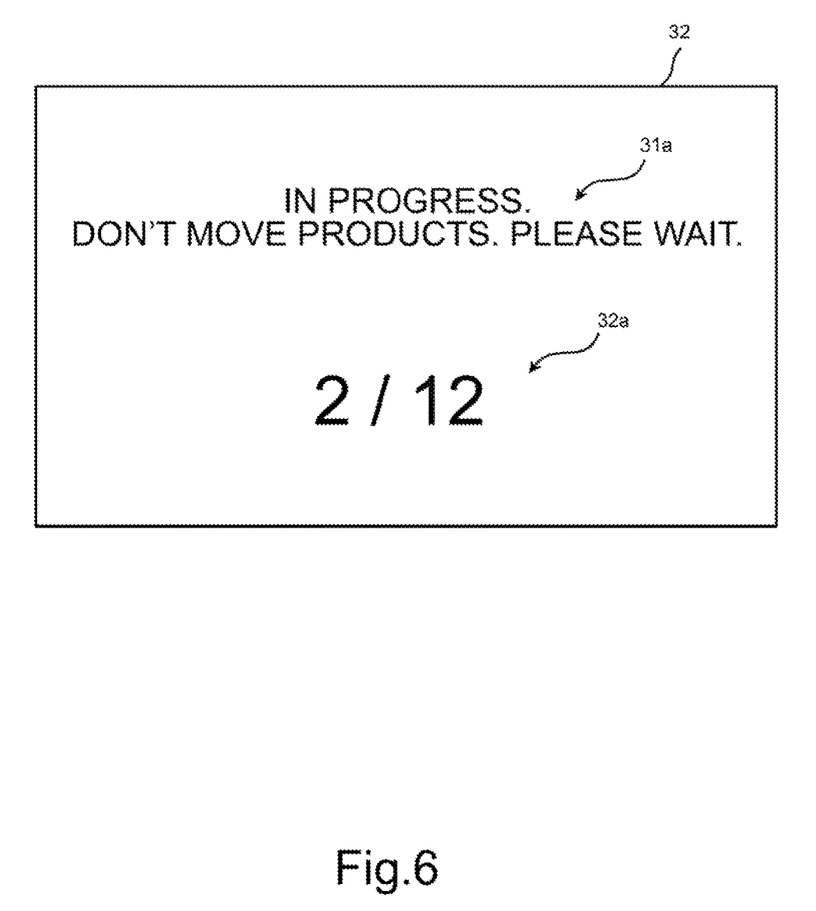
FIG. 6 is a diagram showing an example of the writing-progress screen that the self-checkout machine of the first embodiment displays.

Hereinafter, the updated writing-progress screen will be described with reference to FIG. 6. FIG. 6 is a diagram showing an example of an updated writing-progress screen 32.

As shown in FIG. 6, the writing-progress screen 31 of FIG. 5 is updated, and then the writing-progress screen 32 is displayed. The text 32a "2/12" is displayed on the writing-progress screen 32 instead of the text 31b "1/12" displayed on the writing-progress screen 31. The text 32a "2/12" shows that the processing is progressed.

After the CPU 10 updates the writing-progress screen in Act23, the CPU 10 returns to Act15 of the control processing. After the CPU 10 returns to Act15, the CPU 10 repeats the processing of Act15 to Act23. When the CPU 10 repeats the processing, the CPU 10 sets a flag to each RFID tag, which stores the same tag code as a tag code (see Act9) written in the tag-list area 12a.

Meanwhile, in Act19, if the CPU 10 determines that the tag-list area 12a does not store the same tag code (Act19, No), the CPU 10 skips the processing of Act20 to Act23. The CPU 10 returns from Act19 to Act15 of the control processing.

Further, in Act22, if the CPU 10 determines that the tag-list area 12a does not store a tag code anymore (Act22, No), the CPU 10 proceeds to Act24 of the control processing. For example, in Act21, the CPU 10 deletes the last tag code remained in the tag-list area 12a. In this case, in Act22, the CPU 10 determines that the tag-list area 12a does not store a tag code anymore.

In Act24, the CPU 10 issues a receipt. The result of the payment processing in Act13 is printed on the receipt. Here, the CPU 10 may issue a paper-receipt or an electronic receipt. For example, the CPU 10 generates a receipt-image to issue a paper-receipt. The receipt-image shows the statement, the total payment, the received amount of money, the amount of change, and the like. The statement includes the names of the products of the payment processing, the prices of the products, and the like. The CPU 10 causes the printer 18 to print out the generated receipt-image on paper-for-receipts. The printer 18 cuts off the portion, on which the receipt-image is printed out, from the rest of the paper-for-receipts. The printer 18 discharges the cut-off portion, i.e., a receipt, from the receipt slot 5. Further, in credit-card payment processing, the CPU 10 causes the printer 18 to also issue a credit-card receipt. The CPU 10 issues paper-receipts to the buyer as described above. Further, the CPU 10 generates receipt-data to issue an electronic receipt. The receipt-data includes information to be written in a receipt. The CPU 10 sends the generated receipt-data to, for example, a central server (not shown) via the communication network 200. An arbitrary data communication terminal that the buyer owns accesses the central server, and the buyer browses the receipt-data. In other words, when the CPU 10 executes the control processing based on the control program, the computer, which includes the CPU 10 as the nucleus, functions as issuing-control means. Further, the issuing-control means cooperates with the printer 18, and they thereby functions as issuance means. After the CPU 10 issues a receipt as described above, the CPU 10 proceeds to Act25 of the control processing.

In Act25, the CPU 10 determines if it is necessary to give change to the buyer or not (result of payment processing in Act13). If the CPU 10 determines that it is necessary to give change to the buyer (Act25, Yes), the CPU 10 proceeds to Act26 of the control processing.

In Act26, the CPU 10 causes the automatic changer 20 to give change to the buyer. After the CPU 10 causes the automatic changer 20 to give change to the buyer, the CPU 10 proceeds to Act27 of the control processing. In other words, when the CPU 10 executes the control processing based on the control program, the computer, which includes the CPU 10 as the nucleus, functions as change-control means. Further, the change-control means cooperates with the automatic changer 20, and they thereby function as changer means. Meanwhile, in Act25, if the CPU 10 determines that it is not necessary to give change to the buyer (Act25, No), the CPU 10 skips the processing of Act26. The CPU 10 proceeds to Act27 the control processing after Act25.

In Act27, the CPU 10 determines if preset waiting time has passed or not. If the CPU 10 determines that the preset waiting time has not passed (Act27, No), the CPU 10 returns to Act27 of the control processing. If the CPU 10 returns to Act27, the CPU 10 repeats the processing of Act27. This situation means that the CPU 10 is in the standby mode. In the standby mode, the CPU 10 waits for the waiting time to pass. The CPU 10 starts to keep time (waiting time) when the CPU 10 firstly executes the processing of Act27, for example. In the standby mode, the CPU 10 may cause the touchscreen panel 2 to display an exit screen. The exit screen informs the buyer that the checkout processing is finished. Meanwhile, in Act27, if the CPU 10 determines that the preset waiting time has passed (Act27, Yes), the CPU 10 returns to Act1 (see FIG. 3) of the control processing. If the CPU 10 returns to the processing of Act1, the CPU 10 executes the processing of Act1 and thereafter. In other words, the CPU 10 starts the next checkout processing, for example, checkout processing for a different buyer.

In the processing of Act1, the CPU 10 again executes the initialization processing of the respective components including the tag-list area 12a. In the initialization processing, the CPU 10 clears information stored in the tag-list area 12a. Meanwhile, as described above, in the previous checkout processing, the CPU 10 deletes tag data (Act21) again and again until the CPU 10 determines that the tag-list area 12a does not store a tag code anymore (Act22). In other words, when the waiting time passes (Act27) and the CPU 10 returns to Act1 of the control processing for the next checkout processing, the tag-list area 12a stores no tag data anymore. In other words, the CPU 10 has cleared information stored in the tag-list area 12a. In view of this, in the initialization processing (Act1) for the next checkout processing, the CPU 10 may not clear the tag-list area 12a.

As described above, information stored in the tag-list area 12a is cleared. In this situation, in Act3, controlled by the CPU 10, the tag reader 22 starts the readout-operation again. In other words, when the CPU 10 executes the control processing based on the control program, the computer, which includes the CPU 10 as the nucleus, functions as start-control means.

In conclusion, according to the self-checkout machine 100, the CPU 10 stops the readout-operation executed by the tag reader 22 before the CPU 10 starts payment processing (see Act12). Further, after the payment processing is completed, the CPU 10 activates the tag reader 22 again. The CPU 10 causes the tag reader 22 to send cancel commands to RFID tags. Each RFID tag thereby sets a flag (see Act20). The CPU 10 sends the cancel commands to the RFID tags, and thereby causes each RFID tag to set the flag. In other words, the CPU 10 executes data-change processing. In the data-change processing, the CPU 10 causes each RFID tag to write readout-completed data therein.

RFID tags can be used as security tags. For example, a security gate is installed in a store, and the security gate includes a tag reader. A buyer brings products, and passes through the security gate. RFID tags are attached to the products. The tag reader of the security gate reads tag data of the RFID tags. The security gate determines if each piece of read tag data has set a flag or not. If a piece of tag data has not set the flag, the security gate raises an alarm. Specifically, the self-checkout machine 100 has read the tag data of products, but the payment processing is not executed yet. A buyer brings such products, and passes through the security gate. In this case, the security gate determines that the RFID tags, which are attached to the products that the buyer brings, have not written readout-completed data therein. The security gate raises an alarm. In other words, the security gate is capable of accurately determining that the buyer intends to bring the products, of which the payment processing is not executed yet, to the outside of the store, and capable of raising an alarm. If the payment processing of products that a buyer brings has been already executed, the RFID tags, which are attached to the products that the buyer brings, have written readout-completed data therein. So when the buyer passes through the security gate, the security gate raises no alarm.

A buyer may not recognize that the data-change processing, in which readout-completed data is written in RFID tags, is part of a checkout procedure. The buyer cannot understand the necessity of a lag time, in which the data-change processing is executed to write the readout-completed data. The buyer may gain a feeling of anxiety. To the contrary, the self-checkout machine 100 displays the writing-progress screen when the data-change processing is being executed to write readout-completed data in RFID tags. A buyer watches the writing-progress screen, and may thereby recognize that the self-checkout machine 100 is executing some kind of processing. So the buyer may wait for the processing of the self-checkout machine 100 to end without gaining a feeling of anxiety.

The self-checkout machine 100 issues a receipt after the self-checkout machine 100 completes the payment processing of products. A buyer brings the products to the outside of the store after the receipt is issued, and is not doing anything unfair at all. Further, in general, a buyer may usually recognize that all the checkout procedure has been completed after the self-checkout machine 100 issues a receipt. If the self-checkout machine 100 issues a receipt before the self-checkout machine 100 is yet to complete the data-change processing to write readout-completed data in RFID tags, a buyer will bring products, in which readout-completed data is yet to be written, and will pass through a security gate. As a result, the security gate will raise an alarm for the buyer who is not wrong. This situation may occur frequently. As described above, normally, issuance of a receipt means that the payment processing of the products that the buyer has is completed. Both the store and the buyer will not prefer the above-mentioned situation, in which the security gate raises an alarm for the buyer who is not wrong. To the contrary, the self-checkout machine 100 issues a receipt after the self-checkout machine 100 completes the data-change processing to write readout-completed data in RFID tags. So the self-checkout machine 100 does not cause the above-mentioned situation, in which a security gate raises an alarm for a buyer who is not wrong.

Further, the self-checkout machine 100 gives change to a buyer after the payment processing of products. So the buyer brings the products to the outside of the store after he receives change, and is not doing anything unfair at all. Further, in general, a buyer may usually recognize that all the checkout procedure has been completed after he receives change. If the self-checkout machine 100 gives change to a buyer before the self-checkout machine 100 is yet to complete the data-change processing to write readout-completed data in RFID tags, a buyer will bring products, in which readout-completed data is yet to be written, and will pass through a security gate. As a result, the security gate will raise an alarm for the buyer who is not wrong. This situation may occur frequently. As described above, normally, to receive change means that the payment processing of the products that the buyer has is completed. Both the store and the buyer will not prefer the above-mentioned situation, in which the security gate raises an alarm for the buyer who is not wrong. To the contrary, the self-checkout machine 100 gives change to a buyer after the self-checkout machine 100 completes the data-change processing to write readout-completed data in RFID tags. So if the self-checkout machine 100 needs to give change to a buyer, the self-checkout machine 100 does not cause the above-mentioned situation, in which a security gate raises an alarm for the buyer who is not wrong.

The above-mentioned first embodiment may be variously modified and executed as described below.

For example, the CPU 10 executes the data-change processing. As a result, it is possible to determine that the tag reader has read tag data of RFID tags. In the data-change processing, new data may be written in RFID tags to determine that the tag reader has read tag data instead of setting flags in the RFID tags. Further, in the data-change processing, the CPU 10 may delete or change all of or part of the data stored in the RFID tags such as the tag codes, for example.

Further, for example, an independent tag reader 22 may be attached to the self-checkout machine 100 externally.

Further, a checkout machine, which is operated by a store clerk, may execute the checkout processing similar to that of the first embodiment.

Further, electronic tags attached to products may not necessarily be RFID tags. The checkout processing similar to that of the first embodiment may be executed even if electronic tags other than RFID tags are used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A payment processor, comprising:
a tag reader which reads tag data stored in an electronic tag attached to each of one or more products;
a memory which stores the tag data read by the tag reader;
an operation panel which:
receives a request to start checkout processing including payment processing of the one or more products,
displays a registration screen including a payment button and a product list, the product list being generated based on the tag data stored in the memory and listing product information of each of the one or more products for which the tag data stored in the corresponding electronic tag is read by the tag reader, and
receives, as an operation on the payment button, a request to start the payment processing; and
a processor which:
activates the tag reader and causes the tag reader to start readout-operation when the operation panel receives the request to start the checkout processing of the one or more products,
writes tag data read by the activated tag reader in the memory,
updates the product list displayed in the registration screen on the operation panel to list the product information of each of the one or more products for which the tag data stored in the corresponding electronic tag is read by the activated tag reader, based on the tag data stored in the memory,
stops the readout-operation by the tag reader when the operation panel receives the request to start the payment processing,
executes the payment processing after the readout-operation by the tag reader is stopped, and
executes data-change processing to write readout-completed data in an electronic tag identified by the tag data stored in the memory after the payment processing, the readout-completed data showing that the tag reader has read the electronic tag, wherein
the tag reader has a predetermined readable zone and reads tag data stored in the electronic tag attached to the each of the one or more products in the predetermined readable zone, and
the operation panel displays a writing-progress screen calling attention to a buyer so as not to take the one or more products off the predetermined readable zone when the processor is executing the data-change processing.

2. The payment processor according to claim 1, further comprising:
a printer, wherein
the processor further controls the printer to issue a receipt showing the result of the payment processing after the data-change processing.

3. The payment processor according to claim 2, wherein the processor generates data for printing of the receipt showing the result of the payment processing.

4. The payment processor according to claim 1, further comprising:
an automatic changer, wherein
the processor controls the automatic changer to give change to a buyer after the data-change processing if it is necessary to give the change to the buyer as the result of the payment processing.

5. The payment processor according to claim 4, wherein after the data-change processing, the processor:
further executes deletion processing to delete the tag data from the memory, and
starts the readout-operation by the tag reader for the next checkout processing after the deletion processing in response to the request to start checkout processing.

6. The payment processor according to claim 1, wherein the processor executes the data-change processing for all electronic tags identified by all pieces of tag data stored in the memory.

7. A payment processor, comprising:
a tag reader which reads tag data stored in an electronic tag attached to each of one or more products;
a memory which stores the tag data read by the tag reader;
an operation panel which:
receives a request to start checkout processing including payment processing of the one or more products,
displays a registration screen including a payment button and a product list, the product list being generated based on the tag data stored in the memory and listing product information of each of the one or more products for which the tag data stored in the corresponding electronic tag is read by the tag reader, and
receives, as an operation on the payment button, a request to start the payment processing; and
a processor which:
activates the tag reader and causes the tag reader to start readout-operation when the operation panel receives the request to start the checkout processing of the one or more products,
writes tag data read by the activated tag reader in the memory,
updates the product list displayed in the registration screen on the operation panel to list the product information of each of the one or more products for which the tag data stored in the corresponding electronic tag is read by the activated tag reader, based on the tag data stored in the memory,
stops the readout-operation by the tag reader when the operation panel receives the request to start the payment processing,
executes the payment processing after the readout-operation by the tag reader is stopped,
executes data-change processing to write readout-completed data in an electronic tag identified by the tag data stored in the memory after the payment processing, the readout-completed data showing that the tag reader has read the electronic tag
determines if the tag data read by the activated tag reader is stored in the memory or not, and
writes the tag data read by the activated tag reader in the memory if the tag data read by the activated tag reader is not stored in the memory.

8. The payment processor according to claim 7, wherein the operation panel displays a writing-progress screen showing the progress of the data-change processing when the processor is executing the data-change processing.

9. The payment processor according to claim 7, further comprising:
a printer, wherein
the processor further controls the printer to issue a receipt showing the result of the payment processing after the data-change processing.

10. The payment processor according to claim 9, wherein the processor generates data for printing of the receipt showing the result of the payment processing.

11. The payment processor according to claim 7, further comprising:
an automatic changer, wherein
the processor controls the automatic changer to give change to a buyer after the data-change processing if it is necessary to give the change to the buyer as the result of the payment processing.

12. The payment processor according to claim 11, wherein
after the data-change processing, the processor:
further executes deletion processing to delete the tag data from the memory, and
starts the readout-operation by the tag reader for the next checkout processing after the deletion processing in response to the request to start checkout processing.

13. The payment processor according to claim 7, wherein the processor executes the data-change processing for all electronic tags identified by all pieces of tag data stored in the memory.

14. A payment processor, comprising:
a tag reader which reads tag data stored in an electronic tag attached to each of one or more products;
a memory which stores the tag data read by the tag reader;
an operation panel which:
receives a request to start checkout processing including payment processing of the one or more products,
displays a registration screen including a payment button and a product list, the product list being generated based on the tag data stored in the memory and listing product information of each of the one or more products for which the tag data stored in the corresponding electronic tag is read by the tag reader, and
receives, as an operation on the payment button, a request to start the payment processing; and
a processor which:
activates the tag reader and causes the tag reader to start readout-operation when the operation panel receives the request to start the checkout processing of the one or more products,
writes tag data read by the activated tag reader in the memory,
updates the product list displayed in the registration screen on the operation panel to list the product information of each of the one or more products for which the tag data stored in the corresponding electronic tag is read by the activated tag reader, based on the tag data stored in the memory,
stops the readout-operation by the tag reader when the operation panel receives the request to start the payment processing,
executes the payment processing after the readout-operation by the tag reader is stopped,
executes data-change processing to write readout-completed data in an electronic tag identified by the tag data stored in the memory after the payment processing, the readout-completed data showing that the tag reader has read the electronic tag, and
reactivates the tag reader for executing the data-change processing after the payment processing.

15. The payment processor according to claim 14, wherein
the processor:
determines if the tag data read by the reactivated tag reader is in the memory or not, and
executes the data-change processing for the electronic tag identified by the tag data which is read by the reactivated tag reader if the tag data read by the reactivated tag reader is in the memory.

16. The payment processor according to claim 14, wherein
the operation panel displays a writing-progress screen showing the progress of the data-change processing when the processor is executing the data-change processing.

17. The payment processor according to claim 14, further comprising:

a printer, wherein the processor further controls the printer to issue a receipt showing the result of the payment processing after the data-change processing.

18. The payment processor according to claim 17, wherein the processor generates data for printing of the receipt showing the result of the payment processing.

19. The payment processor according to claim 14, further comprising:

an automatic changer, wherein the processor controls the automatic changer to give change to a buyer after the data-change processing if it is necessary to give the change to the buyer as the result of the payment processing.

20. The payment processor according to claim 19, wherein after the data-change processing, the processor:

further executes deletion processing to delete the tag data from the memory, and starts the readout-operation by the tag reader for the next checkout processing after the deletion processing in response to the request to start checkout processing.

\* \* \* \* \*